US012554269B2

(12) United States Patent
Duggal et al.

(10) Patent No.: US 12,554,269 B2
(45) Date of Patent: Feb. 17, 2026

(54) PROVIDING AVATAR SUPPORT AFTER SEISMIC EVENT

(71) Applicant: International Business Machines Corporation, Armonk, NY (US)

(72) Inventors: Anita Duggal, Delhi (IN); Mukundan Sundararajan, Bangalore (IN); Sudarshan ., Delhi (IN); Hemant Singh, Gurgaon (IN); Deepak Malik, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 18/402,980

(22) Filed: Jan. 3, 2024

(65) Prior Publication Data

US 2025/0216866 A1  Jul. 3, 2025

(51) Int. Cl.
| G05D 1/656 | (2024.01) |
| G05D 1/243 | (2024.01) |
| G05D 1/246 | (2024.01) |
| G05D 1/247 | (2024.01) |
| H04W 64/00 | (2009.01) |
| H04W 76/40 | (2018.01) |
| G05D 105/55 | (2024.01) |

(52) U.S. Cl.
CPC ............ G05D 1/656 (2024.01); G05D 1/243 (2024.01); G05D 1/246 (2024.01); G05D 1/247 (2024.01); H04W 64/006 (2013.01); H04W 76/40 (2018.02); G05D 2105/55 (2024.01)

(58) Field of Classification Search
None
See application file for complete search history.

(56) References Cited

U.S. PATENT DOCUMENTS

| 8,150,044 | B2 | 4/2012 | Goldstein et al. |
| 11,137,746 | B2 | 10/2021 | Von et al. |
| 2017/0206795 | A1 | 7/2017 | Kaleal et al. |
| 2022/0066456 | A1* | 3/2022 | Ebrahimi Afrouzi ........................ G06F 3/04883 |

(Continued)

FOREIGN PATENT DOCUMENTS

| CN | 105538285 A | 5/2016 |
| CN | 109514574 A | 3/2019 |
| CN | 109986583 A | 7/2019 |

(Continued)

OTHER PUBLICATIONS

Gao et al., "Coal Mine Detect and Rescue Robot Design and Research", 2008 IEEE International Conference on Networking, Sensing and Control, Apr. 1, 2008, pp. 780-785 (Year: 2008).*

(Continued)

*Primary Examiner* — Tamara L Weber
(74) *Attorney, Agent, or Firm* — Yee & Associates, P.C.

(57) ABSTRACT

Providing avatar support for trapped seismic event survivors is provided. A survivor is detected in debris of a collapsed structure using a set of sensors. An avatar communicates with the survivor. Fresh air flow drawn from different directions is measured to detect a pathway through the debris to an environment outside the collapsed structure. The pathway is detected through the debris to the environment outside the collapsed structure based on measuring the fresh air flow drawn from the different directions.

20 Claims, 6 Drawing Sheets

(56) References Cited

U.S. PATENT DOCUMENTS

| | | | | |
|---|---|---|---|---|
| 2023/0242143 | A1* | 8/2023 | Baughman | B60W 60/001 701/4 |
| 2023/0330862 | A1* | 10/2023 | Hanson, Jr. | G06F 3/167 |

FOREIGN PATENT DOCUMENTS

| | | | |
|---|---|---|---|
| IN | 201811039844 | * | 4/2020 |
| KR | 20140050785 A | | 4/2014 |

OTHER PUBLICATIONS

Murphy et al., "Mobile Robots in Mine Rescue and Recovery", IEEE Robotics & Automation Magazine, vol. 16, Issue 2, Jul. 1, 2009, pp. 91-103 (Year: 2009).*

Tian et al., "A Navigation Control Strategy with Hybrid Architecture for Rescue Robot", 2010 IEEE International Conference on Intelligent Computing and Intelligent Systems, vol. 1, Oct. 1, 2010, pp. 675-680 (Year: 2010).*

Li et al., "Intelligent Escape of Robotic Systems: A Survey of Methodologies, Applications, and Challenges", Journal of Intelligent & Robotic Systems, Oct. 31, 2023, pp. 1-18 (Year: 2023).*

Anonymous, "Digital Teleportation in the Metaverse," Aug. 8, 2022, 5 pages, ip.com, accessed Dec. 8, 2023, https://ip.com/IPCOM/000270755.

Anonymous, "Method and System for Optimum Material Movement Mode Selection in Any Multi-Robotic Ecosystem Activity Area," Jun. 22, 2023, 8 pages, ip.com, accessed Dec. 8, 2023, https://ip.com/IPCOM/000272555.

BlueZone, "Building Collapse Sound Effects," Copyright 2023, 6 pages, BlueZone Corporation, accessed Dec. 21, 2023, https://www.bluezone-corporation.com/samples/building-collapse-sound-effects-download.

Murphy, "Texas A&M Rescue Robotics Expert Explains Technologies Used In Florida Condo Collapse," The Conversation, Jun. 30, 2021, 6 pages, Texas A&M Today, accessed on Dec. 21, 2023, https://today.tamu.edu/2021/06/30/texas-am-rescue-robotics-expert-explains-technologies-used-in-florida-condo-collapse/.

Tadokoro, "Disaster Response Robot," Encyclopedia of Systems and Control, Jan. 1, 2015, pp. 284-289, SpringerLink, accessed on Dec. 21, 2023, https://link.springer.com/ referenceworkentry/10.1007/978-1-4471-5058-9_181.

Uddin et al., "Search and Rescue System for Alive Human Detection by Semi-autonomous Mobile Rescue Robot," 2016 International Conference on Innovations in Science, Engineering and Technology (ICISET), Oct. 28-29, 2016, 5 pages, IEEE, accessed Dec. 8, 2023, https://ieeexplore.ieee.org/document/7856489.

* cited by examiner

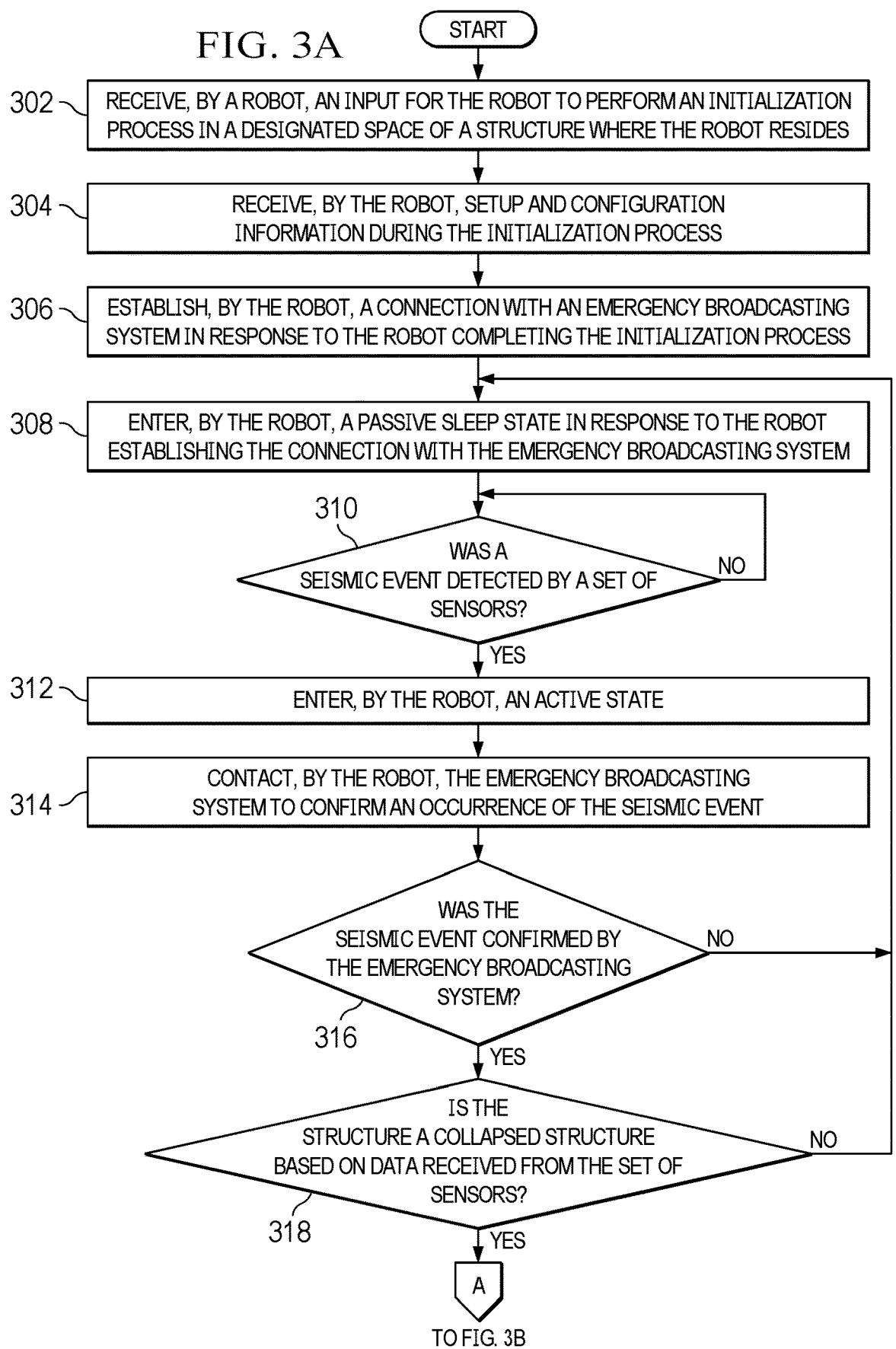

US 12,554,269 B2

1

PROVIDING AVATAR SUPPORT AFTER SEISMIC EVENT

BACKGROUND

The disclosure relates generally to seismic events and more specifically to providing support after a seismic event.

Seismic events (e.g., earthquakes, volcanic eruptions, explosions, or the like) can lead to damage to people and property. For example, a major seismic event can cause structures to collapse, which leads to people being trapped under the debris. Often, it is difficult to locate these people who are trapped under the debris. Any support from emergency responders (e.g., rescue teams, authorities, doctors, and the like) may take time to reach the area affected by the seismic event to provide needed support to the trapped people. Generally, local people who were not trapped under the debris are always ready to help, but these people may not know the right procedures to provide the needed support to the people trapped under the debris. For example, efforts by locals to help the trapped people may have an adverse impact (e.g., cause more damage) to the structure and trapped people. In addition, the trapped people under the debris may not know whether help is coming and may feel helpless. These trapped individuals may be searching for any indication that others are trying to reach them or for any kind of encouragement to remain hopeful that they will be rescued.

SUMMARY

According to one illustrative embodiment, a computer-implemented method for providing avatar support for trapped seismic event survivors is provided. A robot detects a survivor in debris of a collapsed structure using a set of sensors. The robot communicates with the survivor via an avatar generated by the robot. The robot measures fresh air flow drawn from different directions around the survivor to detect a pathway through the debris to an environment outside the collapsed structure using a fresh air detector. The robot detects the pathway through the debris to the environment outside the collapsed structure based on measuring the fresh air flow drawn from the different directions. According to other illustrative embodiments, a computer system and computer program product for providing avatar support for trapped seismic event survivors are provided.

BRIEF DESCRIPTION OF THE DRAWINGS

FIGS. 3A-3D are a flowchart illustrating a process for providing avatar support for trapped seismic event survivors in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
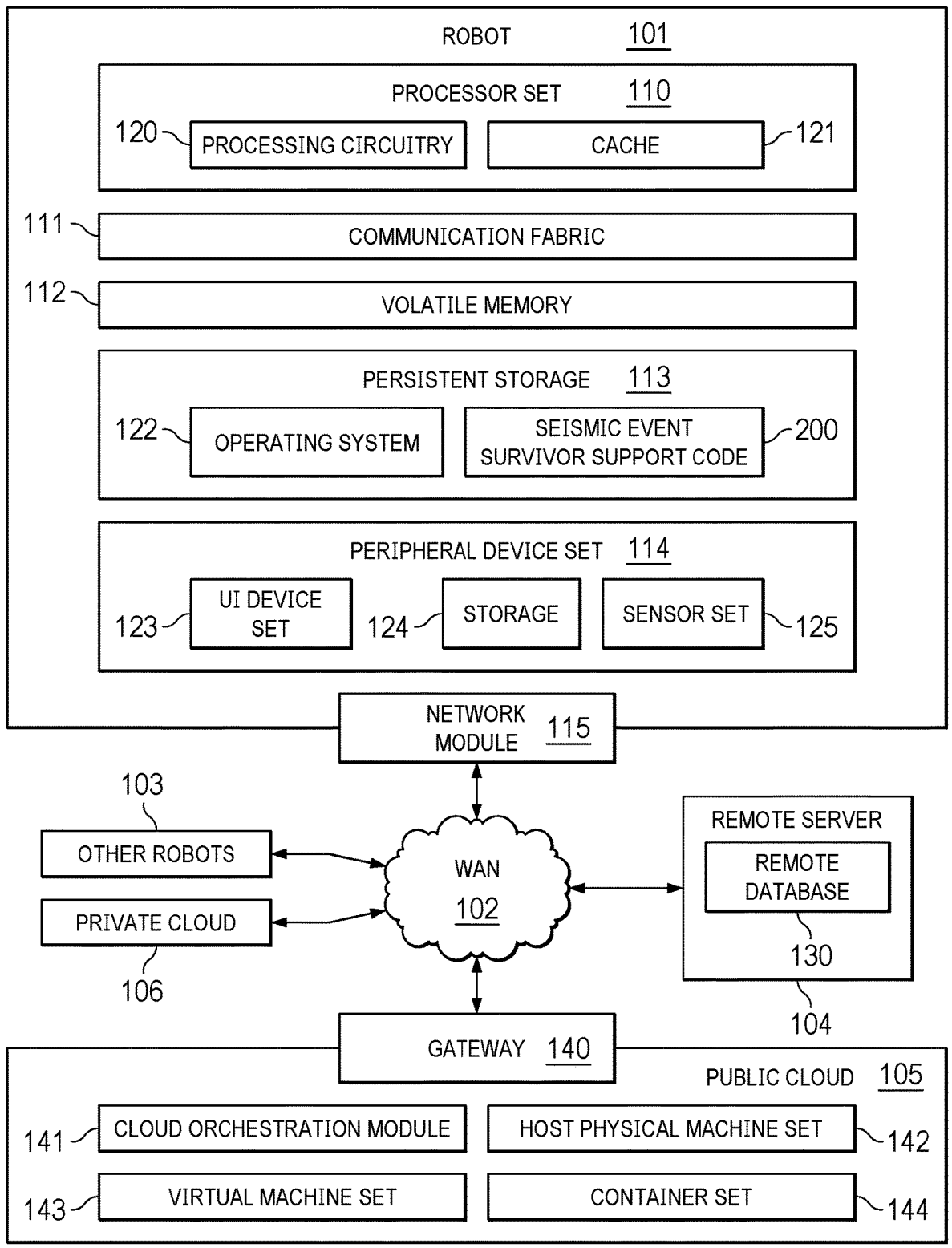
FIG. 1 is a pictorial representation of a computing environment in which illustrative embodiments may be implemented.
Figure 2:
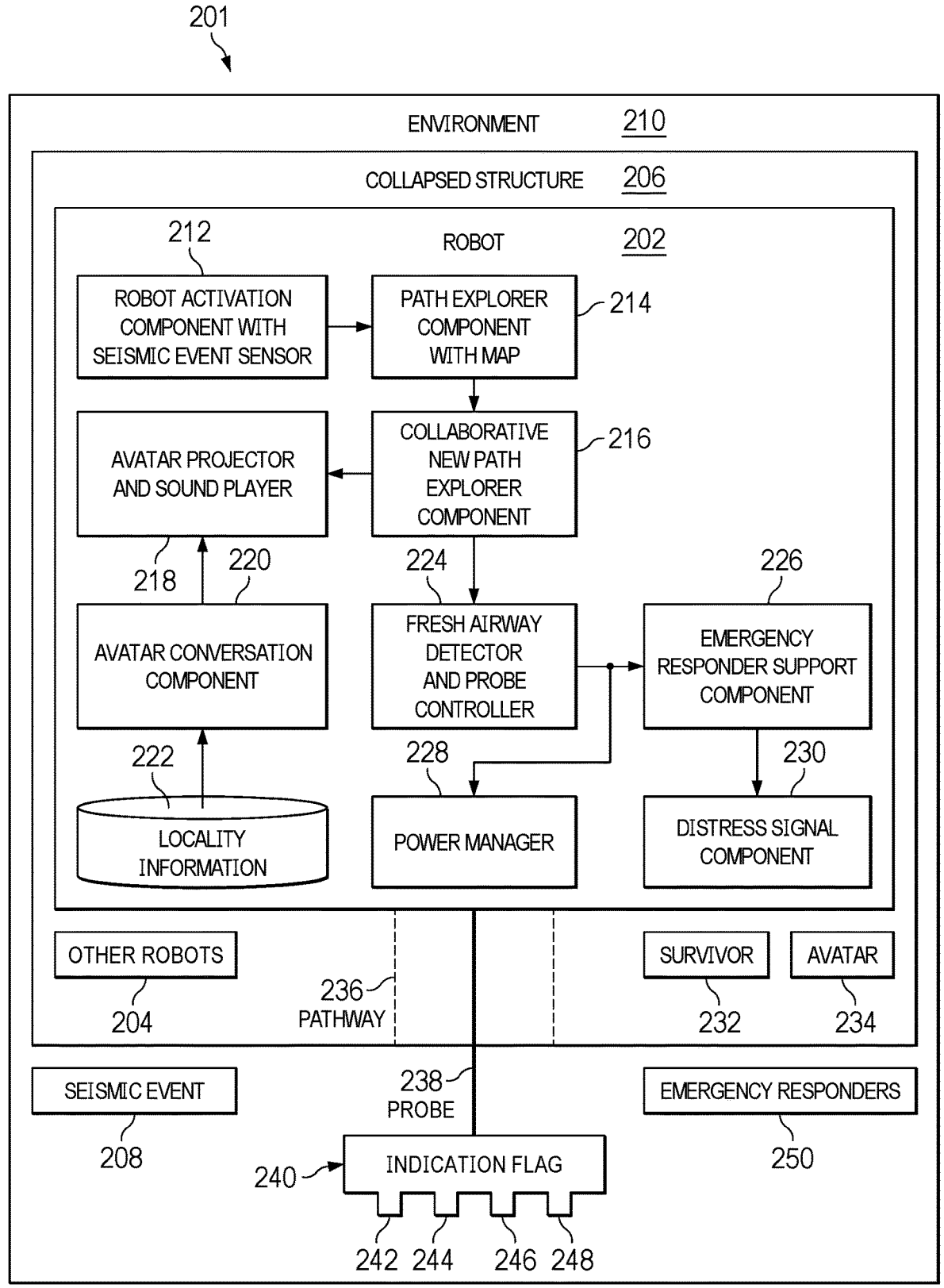
FIG. 2 is a diagram illustrating an example of a seismic event survivor support system in accordance with an illustrative embodiment.
Figure 3B:
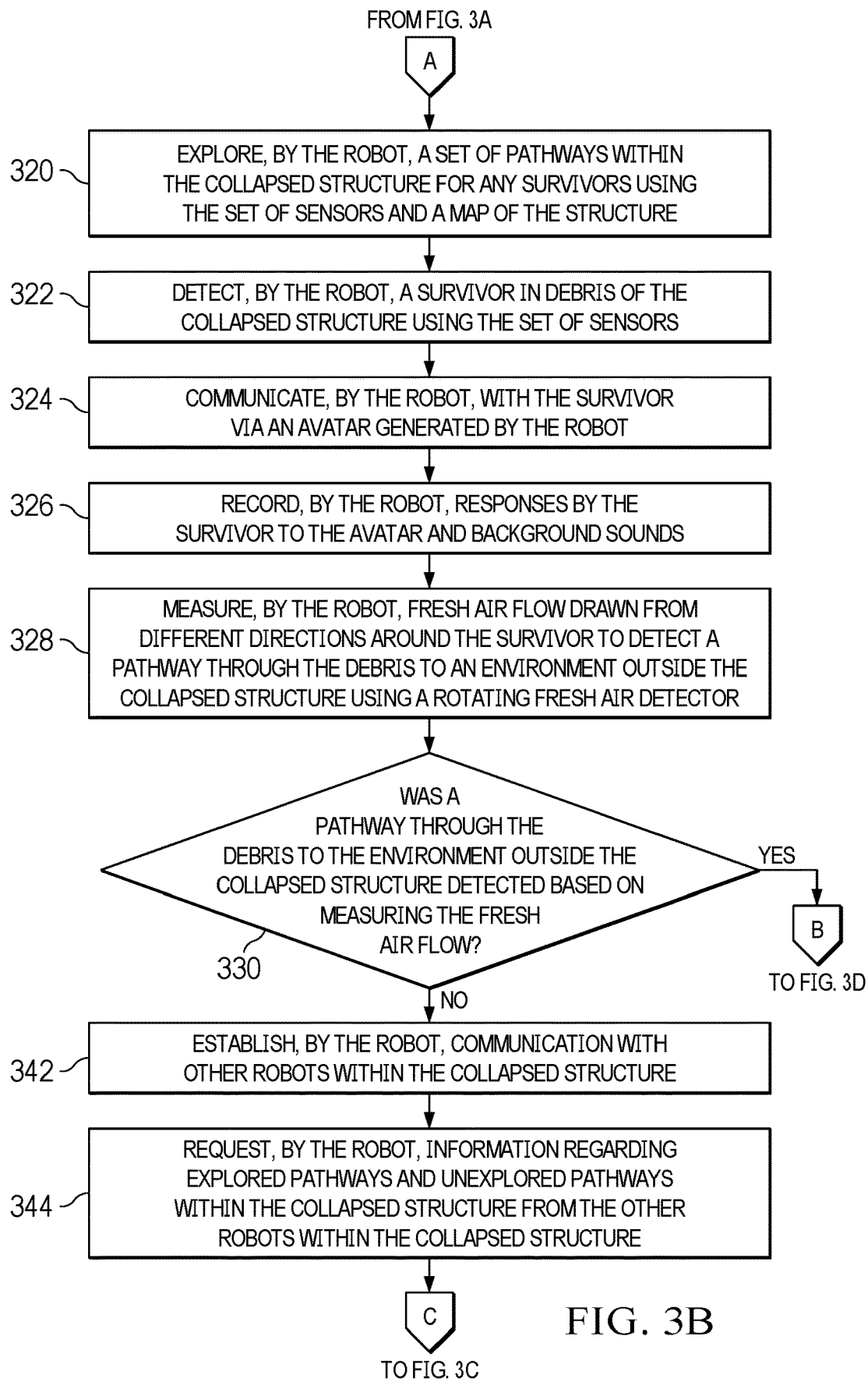
Figure 3C:
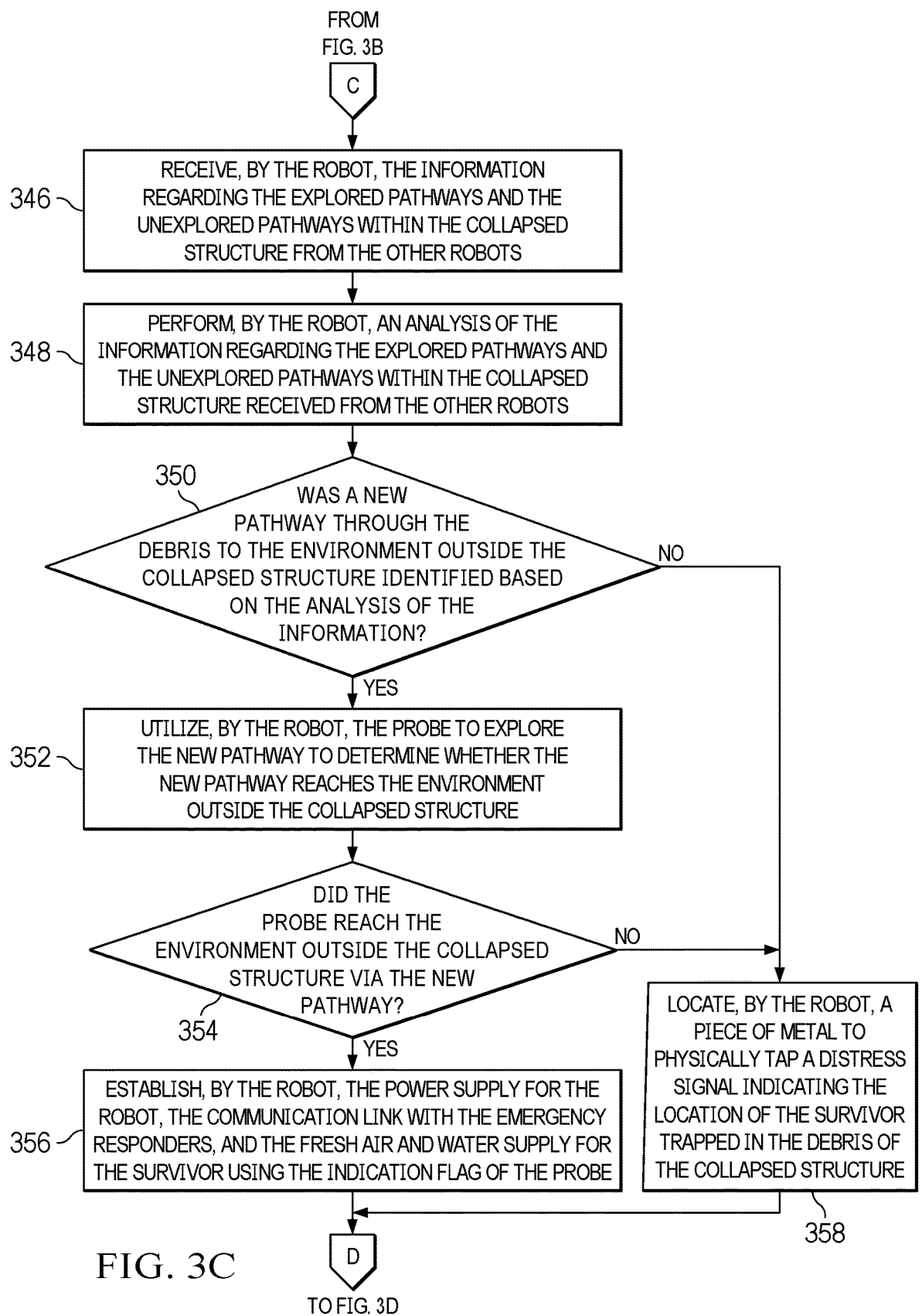
Figure 3D:
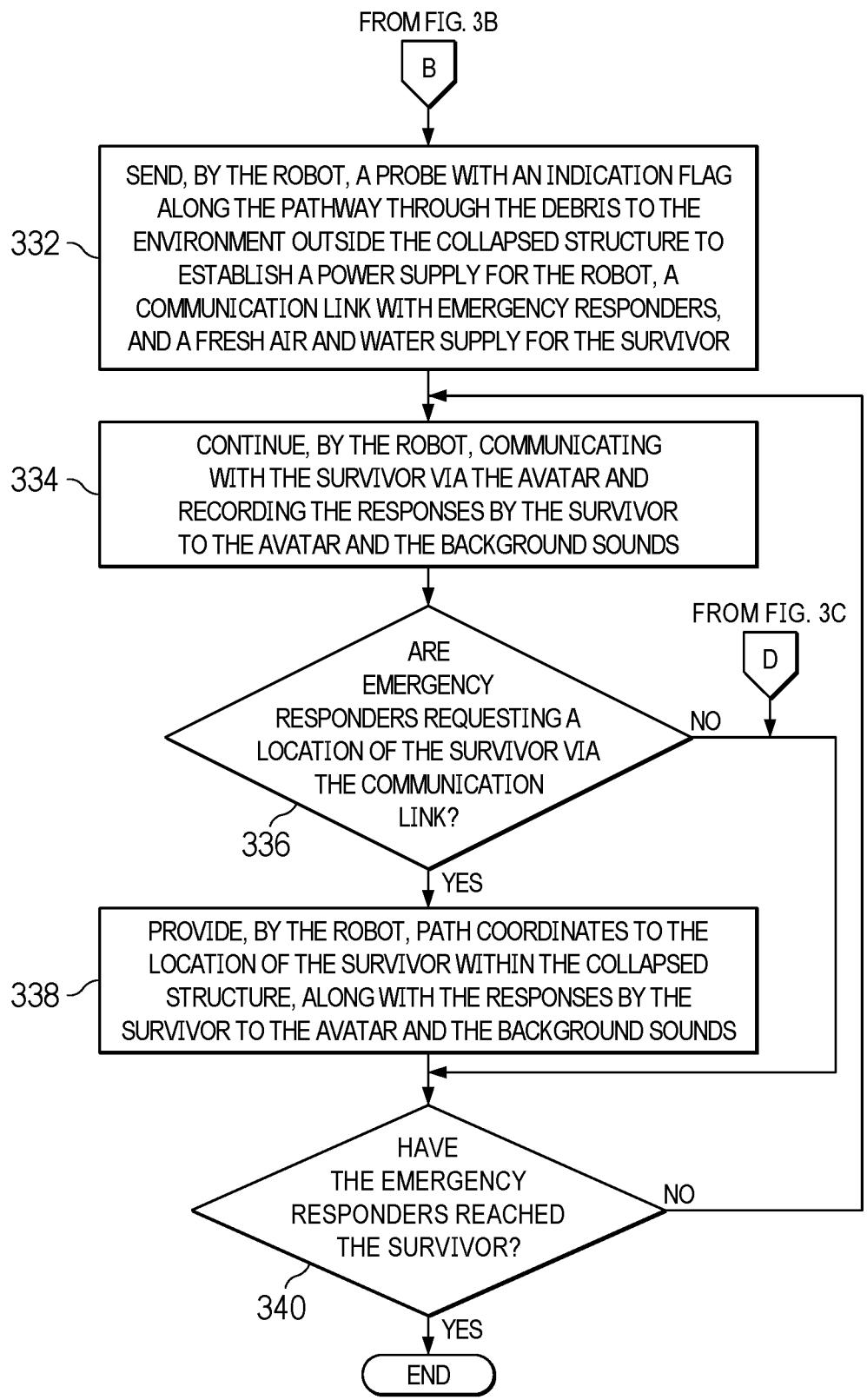

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as seismic event survivor support code 200. For example, robot 101 includes a map of a set of pathways to explore after activation caused by a seismic event. Seismic event survivor support code 200 of robot 101 utilizes the map to find any person who may be alive under the debris within a partially or fully collapsed structure (e.g., office building, apartment building, warehouse, store, house, or the like) to make initial contact with a surviving, trapped person. In addition, robot 101, utilizing seismic event survivor support code 200, can work with other similar robots within the collapsed structure to share information as to which pathways have already been explored for survivors. On finding a survivor, robot 101, utilizing seismic event survivor support code 200, attempts to find a pathway to establish communication and power connections with the environment outside of the collapsed structure while awaiting emergency responders (e.g., rescue teams, authorities, and the like). Further, until emergency responders reach the survivor, robot 101, utilizing seismic event survivor support code 200, generates an avatar to communicate with the trapped survivor.

Robot 101 remains inactive until the structure collapses due to the seismic event or other event (e.g., building material failure) causing the structure to collapse. Seismic event survivor support code 200 activates robot 101 upon detection of the shock wave caused by the collapse of the structure. Robot 101 searches for survivors (i.e., people that are alive and trapped under the debris), uses an avatar to bolster the trapped person's will to survive, and locates a pathway through the debris of the collapsed structure to obtain an external power source for continued operation and any other needed supplies. If multiple robots within the collapsed structure can establish wireless communication with each other, then these multiple robots can utilize distributed computational power to determine other unexplored pathways within the debris to detect other survivors.

In addition to robot 101 and seismic event survivor support code 200, computing environment 100 includes, for example, wide area network (WAN) 102, other robots 103, remote server 104, public cloud 105, and private cloud 106. In this embodiment, robot 101 includes processor set 110 (including processing circuitry 120 and cache 121), communication fabric 111, volatile memory 112, persistent storage 113 (including operating system 122 and seismic event survivor support code 200, as identified above), peripheral device set 114 (including user interface (UI) device set 123, storage 124, and sensor set 125), and network module 115. Remote server 104 includes remote database 130. Public cloud 105 includes gateway 140, cloud orchestration module 141, host physical machine set 142, virtual machine set 143, and container set 144.

Robot 101 may take the form of any type of robot now known or to be developed in the future that is capable of, for example, motorized mobility, running a program, accessing a network, and querying a database, such as remote database 130. As is well understood in the art of robot technology, and depending upon the technology, performance of a computer-implemented method may be distributed among multiple robots. On the other hand, in this presentation of computing environment 100, detailed discussion is focused on a single robot, specifically robot 101, to keep the presentation as simple as possible. Robot 101 can be connected to a cloud, but robot 101 is not required to be connected to a cloud.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

Computer-readable program instructions are typically loaded onto robot 101 to cause a series of operational steps to be performed by processor set 110 of robot 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in seismic event survivor support code 200 in persistent storage 113.

Communication fabric 111 is the signal conduction path that allows the various components of robot 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In robot 101, the volatile memory 112 is located in a single package and is internal to robot 101, but, alternatively or additionally, the volatile memory may be distributed over multiple packages and/or located externally with respect to robot 101.

Persistent storage 113 is any form of non-volatile storage that is now known or to be developed in the future. The non-volatility of this storage means that the stored data is maintained regardless of whether power is being supplied to robot 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of robot 101. Data communication connections between the peripheral devices and the other components of robot 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, and touchpad. Storage 124 is external storage, such as an external hard drive, or insertable storage, such as an SD card. Storage 124 may be persistent and/or volatile. Sensor set 125 is made up of a plurality of different types of sensors. For example, sensor set 125 can include sound sensors, imaging sensors, thermal sensors, pressure sensors, airflow sensors, motion sensors, and the like.

Network module 115 is the collection of software, hardware, and firmware that allows robot 101 to communicate with other robots 103 and computers through WAN 102. Network module 115 may include hardware, such as Wi-Fi signal transceivers, software for packetizing and/or depacketizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to robot 101 from an external computer or external storage device through a network adapter card or network interface included in network module 115.

WAN 102 is any wide area network (e.g., the internet) capable of communicating data over non-local distances by any technology for communicating data, now known or to be developed in the future. In some embodiments, the WAN 102 may be replaced and/or supplemented by local area networks (LANs) designed to communicate data between robots located in a local area, such as a Wi-Fi network. The WAN and/or LANs typically include hardware such as copper transmission cables, optical transmission fibers, wireless transmission, routers, firewalls, switches, gateway computers, and edge servers.

Other robots 103 are controlled by an entity that operates robot 101, and may take any of the forms discussed above in connection with robot 101. Other robots 103 typically receive helpful and useful data from the operations of robot 101. For example, in a hypothetical case where robot 101 is designed to exchange information with other robots 103, this information would typically be communicated from network module 115 of robot 101 through WAN 102 to other robots 103.

Remote server 104 is any computer system that serves at least some data and/or functionality to robot 101. Remote server 104 may be controlled and used by the same entity that operates robot 101. Remote server 104 represents the machine(s) that collect and store helpful and useful data for use by a robot, such as robot 101. For example, in a hypothetical case where robot 101 is designed and programmed to provide avatar support to trapped seismic event survivors based on historical data, then this historical data may be provided to robot 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

When a seismic event strikes causing structures to collapse in an area, a need exists to provide a solution that places a high priority on saving lives by identifying locations of trapped individuals who are alive under the debris inside a collapsed structure, providing encouragement to those who are trapped alive, and supporting recovery efforts of emergency responders and other people in the area to extricate those trapped as soon as possible.

However, the possibility of running out of battery power is high when mobile devices, such as robots, are used continuously around collapsed structures having multiple layers of concrete, steel, and other debris. In addition, when these mobile devices arrive at a site of a collapsed structure ex post facto, these mobile devices can only capture external images of the collapsed structure, but not internal images within the collapsed structure.

Illustrative embodiments utilize one or more robots that are stored similar to other safety equipment, such as, for example, fire extinguishers, fire hoses, fire axes, and the like, in designated spaces within a structure where people live, work, shop, and the like. In other words, these robots already exist in the structure. Each of these robots includes a plurality of different types of sensors (e.g., sound sensors, imaging sensors, thermal sensors, pressure sensors, airflow sensors, motion sensors, and the like). These robots are triggered into action when the structure collapses during a seismic event causing sounds greater than a defined sound threshold level, which the robots can detect using sound sensors (e.g., microphones). In addition, these robots can utilize pressure sensors to detect the shock wave caused by the collapsing structure to trigger activation of the robots. Further, these robots can determine whether a seismic event has actually occurred or not via received radio signals from, for example, an emergency broadcasting system or the like.

Each respective robot, during initial setup and configuration, is programmed with specific information, such as, for example, address of the structure, interior map of the structure including a detailed map of pathways (e.g., hallways, stairways, crawl spaces, ventilation ducts, and the like) within the structure, number of people typically present in the structure, times when the people are typically present in the structure and the typical location of these people when present within the structure, times when the people are typically absent from the structure, identification (e.g., names and the like) of the people typically present in the structure, a list of emergency contacts (e.g., emergency responders, authorities, doctors, relatives, coworkers, neighbors, and the like), avatars corresponding to each of the emergency contacts, and the like.

The robot identifies the physical location of a person needing help within the collapsed structure using the interior map of the structure (e.g., a geo-bounded map). In addition, the robot identifies a surface or an area to project an avatar that can communicate with the trapped individual to provide encouragement. Alternatively, the robot can generate a holographic avatar to communicate with the trapped person. Further, while waiting for emergency responders to arrive at the collapsed structure, the robot can utilize an avatar to prevent locals who are trying to reach the trapped person from taking any actions that can have a negative outcome causing further danger to the trapped individual or themselves.

The robot tries to establish a continuous external power supply by discovering a pathway or route to a point outside the collapsed structure where the robot can raise an indication flag (either a physical or electronic indication flag) identifying the physical location of the trapped individual. If the robot utilizes a physical indication flag, the physical indication flag can include, for example, electric wires, cables, leads, or the like for obtaining power from an external power source, establishing communication with people (e.g., emergency responders, rescue teams, authorities, doctors, relatives, neighbors, and the like) who are outside the collapsed structure, and obtaining other emergency needs. The physical indication flag can also include a hose, tube, pipe, or the like for collecting fresh air, water, or the like from the environment outside the collapsed structure. Further, the robot can couple with other robots in the collapsed structure to exchange information, such as, for example, identification of pathways already explored within the collapsed structure, identification of any individuals found alive in the debris, identification of any unexplored pathways within the collapsed structure, identification of any potential new pathways through the debris, identification of any unaccounted for individuals who would typically be present in the structure at the time of the seismic event, and the like, which increases the possibility of saving the lives of trapped individuals within the collapsed structure. Moreover, the coupled robots can form a physical chain of linked robots to the environment outside the collapsed structure.

By coupling multiple robots together to share information, illustrative embodiments improve triangulation data to locate survivors under the debris of the collapsed structure. In addition, illustrative embodiments can provide continuous power to robots within the collapsed structure by identifying a pathway through the debris for electrical connections to an external power source. Further, the robots provide needed emotional support to trapped survivors by communicating with trapped survivors via avatars. Furthermore, the robots remain in a passive sleep state saving battery power until triggered to an active state by the shock wave caused by the collapse of the structure during a seismic event.

A person trapped underneath debris of a collapsed structure needs motivation to keep fighting to stay alive. Thus, the robot of illustrative embodiments provides an avatar or any other type of icon representing, for example, a family member, friend, coworker, neighbor, doctor, or the like to communicate with the trapped individual to keep motivational levels high by providing needed encouragement. The robot can also measure fresh air flow around the trapped individual utilizing a rotating vacuum pump to draw in air from a plurality of different direction to test air quality to determine a pathway through the debris to the environment outside the collapsed structure to send a probe that includes the indication flag with wires, cables, tubes, or the like to establish an external power supply, communication channel, and fresh air supply. If the robot cannot determine a pathway through the debris to the environment outside the collapsed structure, then the robot identifies a point along an explored pathway that has exposed metal for the robot to physically tap out a distress signal (e.g., an SOS using Morse code) on the exposed metal.

During robot setup and configuration on initialization, the robot registers with, for example, a service provider, home network, or the like, and receives a mapping of the layout and pathways within the structure where the robot resides, along with other information. The robot periodically connects to a power source for battery recharging. In addition, the robot periodically connects to an emergency broadcasting system to check availability of radio signals and to notify authorities of the robot's current location (e.g., address of the structure, designated space for the robot within the structure, and the like). When the robot detects a loud sound greater than a defined sound threshold level or a shock wave greater than a defined shock wave energy threshold level caused by the collapse of the structure where the robot resides, the robot automatically switches from a passive sleep state to an active state.

Once activated, the robot using, for example, wheels, legs, treads, or the like, moves to locate any survivors under the debris of the collapsed structure within the mapped geo-perimeters identified during the initial setup of the robot. The robot utilizes a plurality of sensors to detect and locate any survivors. Upon finding a survivor within the collapsed structure, the robot displays an avatar to provide the first communication and connection to the trapped person.

After finding and communicating with the trapped person, the robot wirelessly transmits a distress signal. In response to the robot detecting a response to the distress signal, the robot registers the location of the trapped person in need of help with the responder to the distress signal. If the robot does not detect a response to the distress signal after expiration of a defined period of time (e.g., wireless communication is blocked by the debris), the robot starts to explore the collapsed structure to discover a possible pathway to the environment outside of the collapsed structure via detection of fresh airflow using the rotating vacuum pump to pull in airflow threads from different directions. If the robot discovers a pathway to the environment outside of the collapsed structure, the robot outputs the probe with the indication flag that includes an input power receiver, radio signal antenna, fresh air tube, water tube, and the like to the environment outside the collapsed structure. After outputting the probe with the indication flag to the environment outside the collapsed structure, the robot continues providing support to the trapped person. In addition, the robot utilizes the input power receiver to recharge the robot's battery, utilizes the radio signal antenna to transmit a distress signal with the specific location of the trapped person under the debris of the collapsed structure and possibly the identity of the trapped person if the trapped person is able to talk, and utilizes the fresh air tube to supply fresh air to the trapped person.

Furthermore, the robot can utilize the radio signal antenna to receive information regarding which specific avatar to show to the trapped person. In addition, the robot can utilize the avatar to talk with the trapped person to provide encouragement and instructions on how to remain calm and safe until emergency responders can reach the trapped person.

Multiple robots within the collapsed structure can exchange information regarding survivors and which explored pathways have been unsuccessful to reach the environment outside the collapsed structure. One or more of the collaborating robots can analyze the exchanged data to determine whether new pathways through the debris can be identified for establishing communication and power channels to the environment outside the collapsed structure. An example of a determination based on the analysis of the exchanged data can be: determine new map for pathway exploration and split exploration tasks and reporting between robots, and if pathway not found, determine likelihood of finding a point to tap a physical distress signal on metal (e.g., iron or steel rods extending from the concrete).

After emergency responders arrive on scene, the robot can provide a continuous exchange of information between the emergency responders and a survivor. Based on localized conditions of the collapsed structure, the emergency responders can share information with the survivor via the avatar regarding any actions to be taken. Moreover, the robot can also send survivor feedback and information on the conditions immediately surrounding the survivor for improved rescue planning.

Robots can utilize customized avatar conversations fed from external participants as provided by the authorities or emergency responders to increase the confidence and positive mental state regarding the success of rescue. Furthermore, a robot can generate multiple avatars for a single person when needed. For example, when a task needs to be performed under medical supervision, then the robot can provide an avatar corresponding to a doctor to the trapped person in combination with an avatar corresponding to a family member or friend providing comforting support and assurance. The service provider, emergency broadcasting system, or the like that is connected to the robot can dynamically prepare and load the customized avatar conversations to the robot.

Thus, illustrative embodiments provide one or more technical solutions that overcome a technical problem with an inability of current robots of providing emotional support and lifesaving measures to a trapped seismic event survivor within a collapsed structure via an avatar. As a result, these one or more technical solutions provide a technical effect and practical application in the field of robots.

With reference now to FIG. 2, a diagram illustrating an example of a seismic event survivor support system is depicted in accordance with an illustrative embodiment. Seismic event survivor support system 201 may be implemented in a computing environment, such as computing environment 100 in FIG. 1. Seismic event survivor support system 201 is a system of hardware and software components for providing emotional support to trapped seismic event survivors within collapsed structures via robot-generated avatars.

In this example, seismic event survivor support system 201 includes robot 202 and other robots 204 within collapsed structure 206. Robot 202 and other robots 204 may be, for example, robot 101 and other robots 103 in FIG. 1. Collapsed structure 206 can represent any type of structure (e.g., house, building, or the like), which collapsed due to seismic event 208. In addition, collapsed structure 206 can represent a plurality of collapsed structures. Collapsed structure 206 is located in environment 210. Environment 210 can represent any type of environment that includes a plurality of structures, such as, for example, a city, neighborhood, apartment complex, business complex, warehouse complex, or the like.

In this example, robot 202 includes robot activation component with seismic event sensor 212, path explorer component with map 214, collaborative new path explorer component 216, avatar projector and sound player 218, avatar conversation component 220, locality information 222, fresh airway detector and probe controller 224, emergency responder support component 226, power manager 228, and distress signal component 230. Robot 202 utilizes robot activation component with seismic event sensor 212 to activate robot 202 from a passive sleep state upon detection of a seismic event. The seismic event sensor may be, for example, one or more of sensor set 125 in FIG. 1 (e.g., sound sensor, pressor sensor, imaging sensor, or any combination thereof).

Robot 202 utilizes path explorer component with map 214 to explore a mapped set of defined pathways in collapsed structure 206 after seismic event 208 to detect any trapped survivors in the debris. Robot 202 utilizes collaborative new path explorer component 216 to exchange information regarding previously explored paths, as well as unexplored paths, with other robots 204 to possibly identify new pathways through the debris. Robot 202 utilizes avatar projector and sound player 218 to provide emotional support for any trapped survivors found alive, such as survivor 232, within collapsed structure 206 by projecting avatar 234 that can communicate with survivor 232. Robot 202 utilizes avatar conversation component 220 to speak with survivor 232 via avatar 234 based on locality information 222. Locality information 222 can include, for example, language spoken by people living in environment 210 and the like.

Robot 202 utilizes fresh airway detector and probe controller 224 to find a pathway, such as pathway 236, to environment 210 that is outside of collapsed structure 206. Once fresh airway detector and probe controller 224 identifies pathway 236, fresh airway detector and probe controller 224 sends probe 238, which includes indication flag 240, along pathway 236 to environment 210 that is outside of collapsed structure 206. In this example, indication flag 240 includes power receiver 242, communication link 244, fresh air tube 246, and water tube 248. Emergency responders 250 can connect to power receiver 242 to send power to robot 202 for continued operation, communication link 244 to communicate with robot 202 and survivor 232, fresh air tube 246 to provide fresh air to survivor 232, and water tube 248 to supply fresh water to survivor 232.

Robot 202 utilizes emergency responder support component 226 to provide any information (e.g., location of survivor 232) needed by emergency responders 250. Robot 202 utilizes power manager 228 to control power usage of robot 202 until an external source of power can be obtained. Robot 202 utilizes distress signal component 230 to send a wireless distress signal regarding survivor 232 if possible. Robot 202 can also utilize distress signal component 230 to physically tap a distress signal on a piece of metal detected in the debris regarding survivor 232 in the event fresh airway detector and probe controller 224 does not find a pathway to environment 210 outside of collapsed structure 206.

With reference now to FIGS. 3A-3D, a flowchart illustrating a process for providing avatar support for trapped seismic event survivors is shown in accordance with an illustrative embodiment. The process shown in FIGS. 3A-3D may be implemented in a robot, such as, for example, robot 101 in FIG. 1 or robot 202 in FIG. 2. For example, the process shown in FIGS. 3A-3D may be implemented by seismic event survivor support code 200 in FIG. 1.

The process begins when the robot receives an input for the robot to perform an initialization process in a designated space of a structure where the robot resides (step 302). The robot receives setup and configuration information during the initialization process (step 304). The robot establishes a connection with an emergency broadcasting system in response to the robot completing the initialization process (step 306). The robot enters a passive sleep state in response to the robot establishing the connection with the emergency broadcasting system (step 308).

The robot makes a determination as to whether a seismic event was detected by a set of sensors of the robot (step 310). If the robot determines that no seismic event was detected by the set of sensors of the robot, no output of step 310, then the process returns to step 310 where the robot continues to determine whether a seismic event was detected. If the robot determines that a seismic event was detected by the set of sensors of the robot, yes output of step 310, then the robot enters an active state (step 312).

The robot contacts the emergency broadcasting system to confirm an occurrence of the seismic event in response to entering the active state (step 314). The robot makes a determination as to whether the seismic event was confirmed by the emergency broadcasting system (step 316). If the robot determines that the seismic event was not confirmed by the emergency broadcasting system, no output of step 316, then the process returns to step 308 where the robot enters the passive sleep state once again. If the robot determines that the seismic event was confirmed by the emergency broadcasting system, yes output of step 316, then the robot makes a determination as to whether the structure is a collapsed structure based on data received from the set of sensors (step 318). If the robot determines that the structure is not collapsed based on the data received from the set of sensors, no output of step 318, then the process returns to step 308 where the robot enters the passive sleep state once again. If the robot determines that the structure is a collapsed structure based on the data received from the set of sensors, yes output of step 318, then the robot explores a set of pathways within the collapsed structure for any survivors using the set of sensors and a map of the structure (step 320).

Subsequently, the robot detects a survivor in debris of the collapsed structure using the set of sensors (step 322). The robot communicates with the survivor via an avatar generated by the robot (step 324). The robot records responses by the survivor to the avatar and background sounds (step 326).

The robot measures fresh air flow drawn from different directions around the survivor to detect a pathway through the debris to an environment outside the collapsed structure using a rotating fresh air detector (step 328). The robot makes a determination as to whether a pathway through the debris to the environment outside the collapsed structure was detected based on measuring the fresh air flow drawn from the different directions (step 330). If the robot determines that a pathway through the debris to the environment outside the collapsed structure was detected based on measuring the fresh air flow drawn from the different directions, yes output of step 330, then the robot sends a probe with an indication flag along the pathway through the debris to the environment outside the collapsed structure to establish a power supply for the robot, a communication link with emergency responders, and a fresh air and water supply for the survivor (step 332). In addition, the robot continues communicating with the survivor via the avatar and recording the responses by the survivor to the avatar and the background sounds (step 334).

The robot makes a determination as to whether emergency responders are requesting a location of the survivor via the communication link (step 336). If the robot determines that the emergency responders are not requesting the location of the survivor via the communication link, no output of step 336, then the process proceeds to step 340. If the robot determines that the emergency responders are requesting the location of the survivor via the communication link, yes output of step 336, then the robot provides path coordinates to the location of the survivor within the collapsed structure, along with the responses by the survivor to the avatar and the background sounds (step 338).

The robot makes a determination as to whether the emergency responders have reached the survivor (step 340). If the robot determines that the emergency responders have not reached the survivor, no output of step 340, then the process returns to step 334 where the robot continues to communicate with the survivor. If the robot determines that the emergency responders have reached the survivor, yes output of step 340, then the process terminates thereafter.

Returning again to step 330, if the robot determines that no pathway through the debris to the environment outside the collapsed structure was detected based on measuring the fresh air flow drawn from the different directions, no output of step 330, then the robot establishes communication with other robots within the collapsed structure (step 342). The robot request information regarding explored pathways and unexplored pathways within the collapsed structure from the other robots within the collapsed structure (step 344). The robot receives the information regarding the explored pathways and the unexplored pathways within the collapsed structure from the other robots (step 346). The robot performs an analysis of the information regarding the explored pathways and the unexplored pathways within the collapsed structure received from the other robots (step 348).

The robot makes a determination as to whether a new pathway through the debris to the environment outside the collapsed structure was identified based on the analysis of the information regarding the explored pathways and the unexplored pathways within the collapsed structure received from the other robots (step 350). If the robot determines that no new pathway through the debris to the environment outside the collapsed structure was identified based on the analysis of the information regarding the explored pathways and the unexplored pathways within the collapsed structure received from the other robots, no output of step 350, then the process proceeds to step 358. If the robot determines that a new pathway through the debris to the environment outside the collapsed structure was identified based on the analysis of the information regarding the explored pathways and the unexplored pathways within the collapsed structure received from the other robots, yes output of step 350, then the robot utilizes the probe to explore the new pathway to determine whether the new pathway reaches the environment outside the collapsed structure (step 352).

The robot makes a determination as to whether the probe reached the environment outside the collapsed structure via the new pathway (step 354). If the robot determines that the probe did reach the environment outside the collapsed structure via the new pathway, yes output of step 354, then the robot establishes the power supply for the robot, the communication link with the emergency responders, and the fresh air and water supply for the survivor using the indication flag of the probe (step 356). Thereafter, the process returns to step 340 where the robot determines whether the emergency responders have reached the survivor. If the robot determines that the probe did not reach the environment outside the collapsed structure via the new pathway, no output of step 354, then the robot locates a piece of metal to physically tap a distress signal indicating the location of the survivor trapped in the debris of the collapsed structure (step 358). Thereafter, the process returns to step 340 where the robot determines whether the emergency responders have reached the survivor.

Thus, illustrative embodiments of the present disclosure provide a computer-implemented method, computer system, and computer program product for providing avatar support for trapped seismic event survivors. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing avatar support for trapped seismic event survivors, the computer-implemented method comprising:
    detecting, by a robot, a survivor in debris of a collapsed structure using a set of sensors;
    communicating, by the robot, with the survivor via an avatar generated by the robot;
    measuring, by the robot, fresh air flow drawn from different directions around the survivor to detect a pathway through the debris to an environment outside the collapsed structure using a fresh air detector;
    detecting, by the robot, the pathway through the debris to the environment outside the collapsed structure based on the measuring of the fresh air flow drawn from the different directions; and
    sending, by the robot, a probe with an indication flag along the pathway through the debris to the environment outside the collapsed structure to establish a power supply for the robot.

2. The computer-implemented method of claim 1, further comprising:
    establishing, by the robot, a communication link with emergency responders, and a fresh air and water supply for the survivor in response to the robot determining that the pathway through the debris to the environment outside the collapsed structure was detected based on the measuring of the fresh air flow drawn from the different directions;

continuing, by the robot, communicating with the survivor via the avatar and recording responses by the survivor to the avatar and background sounds;

determining, by the robot, whether the emergency responders are requesting a location of the survivor via the communication link; and providing, by the robot, path coordinates to the location of the survivor within the collapsed structure, along with the responses by the survivor to the avatar and the background sounds in response to the robot determining that the emergency responders are requesting the location of the survivor via the communication link.

3. The computer-implemented method of claim 2, further comprising:

establishing, by the robot, communication with other robots within the collapsed structure in response to the robot determining that the pathway detected through the debris to the environment outside the collapsed structure based on the measuring of the fresh air flow drawn from the different directions is infeasible for sending the probe;

requesting, by the robot, information regarding explored pathways and unexplored pathways within the collapsed structure from the other robots within the collapsed structure;

receiving, by the robot, the information regarding the explored pathways and the unexplored pathways within the collapsed structure from the other robots; and performing, by the robot, an analysis of the information regarding the explored pathways and the unexplored pathways within the collapsed structure received from the other robots.

4. The computer-implemented method of claim 3, further comprising:

determining, by the robot, whether a new pathway through the debris to the environment outside the collapsed structure was identified based on the analysis of the information regarding the explored pathways and the unexplored pathways within the collapsed structure received from the other robots;

utilizing, by the robot, the probe to explore the new pathway to determine whether the new pathway reaches the environment outside the collapsed structure in response to the robot determining that the new pathway through the debris to the environment outside the collapsed structure was identified based on the analysis of the information regarding the explored pathways and the unexplored pathways within the collapsed structure received from the other robots; and determining, by the robot, whether the probe reached the environment outside the collapsed structure via the new pathway.

5. The computer-implemented method of claim 4, further comprising:

establishing, by the robot, the power supply for the robot, the communication link with the emergency responders, and the fresh air and water supply for the survivor using the indication flag of the probe in response to the robot determining that the probe did reach the environment outside the collapsed structure via the new pathway.

6. The computer-implemented method of claim 4, further comprising:

locating, by the robot, a piece of metal to physically tap a distress signal indicating a location of the survivor trapped in the debris of the collapsed structure in response to the robot determining that the probe did not reach the environment outside the collapsed structure via the new pathway.

7. The computer-implemented method of claim 1, further comprising:

receiving, by the robot, an input to perform an initialization process in a designated space of a structure where the robot resides;

receiving, by the robot, setup and configuration information during the initialization process;

establishing, by the robot, a connection with an emergency broadcasting system in response to the robot completing the initialization process; and entering, by the robot, a passive sleep state in response to the robot establishing the connection with the emergency broadcasting system.

8. The computer-implemented method of claim 1, further comprising:

determining, by the robot, whether a seismic event was detected by the set of sensors of the robot;

entering, by the robot, an active state from a passive sleep state in response to the robot determining that the seismic event was detected by the set of sensors of the robot; and contacting, by the robot, an emergency broadcasting system to confirm an occurrence of the seismic event in response to entering the active state.

9. The computer-implemented method of claim 8, further comprising:

determining, by the robot, whether the seismic event was confirmed by the emergency broadcasting system;

determining, by the robot, whether a structure where the robot resides is the collapsed structure based on data received from the set of sensors in response to the robot determining that the seismic event was confirmed by the emergency broadcasting system; and exploring, by the robot, explores a set of pathways within the collapsed structure for any survivors using the set of sensors and a map of the structure in response to the robot determining that the structure is the collapsed structure based on the data received from the set of sensors.

10. A robot for providing avatar support for trapped seismic event survivors, the robot comprising:

a communication fabric;

a set of computer-readable storage media connected to the communication fabric, wherein the set of computer-readable storage media collectively stores program instructions; and a set of processors connected to the communication fabric, wherein the set of processors executes the program instructions to:

detect a survivor in debris of a collapsed structure using a set of sensors;

communicate with the survivor via an avatar generated by the robot;

measure fresh air flow drawn from different directions around the survivor to detect a pathway through the debris to an environment outside the collapsed structure using a fresh air detector;

detect the pathway through the debris to the environment outside the collapsed structure was detected based on measuring the fresh air flow drawn from the different directions; and send a probe with an indication flag along the pathway through the debris to the environment outside the collapsed structure to establish a power supply for the robot.

11. The robot of claim 10, wherein the set of processors further executes the program instructions to:
send a communication link with emergency responders, and a fresh air and water supply for the survivor in response to the robot determining that the pathway through the debris to the environment outside the collapsed structure was detected based on the measuring of the fresh air flow drawn from the different directions;
continue communicating with the survivor via the avatar and record responses by the survivor to the avatar and background sounds;
determine whether the emergency responders are requesting a location of the survivor via the communication link; and
provide path coordinates to the location of the survivor within the collapsed structure, along with the responses by the survivor to the avatar and the background sounds in response to determining that the emergency responders are requesting the location of the survivor via the communication link.

12. The robot of claim 11, wherein the set of processors further executes the program instructions to:
establish communication with other robots within the collapsed structure in response to determining that the pathway detected through the debris to the environment outside the collapsed structure based on measuring the fresh air flow drawn from the different directions is infeasible for sending the probe;
request information regarding explored pathways and unexplored pathways within the collapsed structure from the other robots within the collapsed structure;
receive the information regarding the explored pathways and the unexplored pathways within the collapsed structure from the other robots; and
perform an analysis of the information regarding the explored pathways and the unexplored pathways within the collapsed structure received from the other robots.

13. The robot of claim 12, wherein the set of processors further executes the program instructions to:
determine whether a new pathway through the debris to the environment outside the collapsed structure was identified based on the analysis of the information regarding the explored pathways and the unexplored pathways within the collapsed structure received from the other robots;
utilize the probe to explore the new pathway to determine whether the new pathway reaches the environment outside the collapsed structure in response to determining that the new pathway through the debris to the environment outside the collapsed structure was identified based on the analysis of the information regarding the explored pathways and the unexplored pathways within the collapsed structure received from the other robots; and
determine whether the probe reached the environment outside the collapsed structure via the new pathway.

14. The robot of claim 13, wherein the set of processors further executes the program instructions to:
establish the power supply for the robot, the communication link with the emergency responders, and the fresh air and water supply for the survivor using the indication flag of the probe in response to determining that the probe did reach the environment outside the collapsed structure via the new pathway.

15. A robot comprising non-transitory computer readable storage media and one or more processors configured for providing avatar support for trapped seismic event survivors, the robot having program instructions collectively stored therein, the program instructions executable by a robot to cause the robot to:
detect a survivor in debris of a collapsed structure using a set of sensors;
communicate with the survivor via an avatar generated by the robot;
measure fresh air flow drawn from different directions around the survivor to detect a pathway through the debris to an environment outside the collapsed structure using a fresh air detector;
detect the pathway through the debris to the environment outside the collapsed structure was detected based on measuring the fresh air flow drawn from the different directions; and
send a probe with an indication flag along the pathway through the debris to the environment outside the collapsed structure to establish a power supply for the robot.

16. The robot of claim 15, wherein the program instructions further cause the robot to:
establish a communication link with emergency responders, and a fresh air and water supply for the survivor in response to the robot determining that the pathway through the debris to the environment outside the collapsed structure was detected based on the measuring of the fresh air flow drawn from the different directions;
continue communicating with the survivor via the avatar and record responses by the survivor to the avatar and background sounds;
determine whether the emergency responders are requesting a location of the survivor via the communication link; and
provide path coordinates to the location of the survivor within the collapsed structure, along with the responses by the survivor to the avatar and the background sounds in response to determining that the emergency responders are requesting the location of the survivor via the communication link.

17. The robot of claim 16, wherein the program instructions further cause the robot to:
establish communication with other robots within the collapsed structure in response to determining that the pathway detected through the debris to the environment outside the collapsed structure based on measuring the fresh air flow drawn from the different directions is infeasible for sending the probe;
request information regarding explored pathways and unexplored pathways within the collapsed structure from the other robots within the collapsed structure;
receive the information regarding the explored pathways and the unexplored pathways within the collapsed structure from the other robots; and
perform an analysis of the information regarding the explored pathways and the unexplored pathways within the collapsed structure received from the other robots.

18. The robot of claim 17, wherein the program instructions further cause the robot to:
determine whether a new pathway through the debris to the environment outside the collapsed structure was identified based on the analysis of the information regarding the explored pathways and the unexplored pathways within the collapsed structure received from the other robots;

utilize the probe to explore the new pathway to determine whether the new pathway reaches the environment outside the collapsed structure in response to determining that the new pathway through the debris to the environment outside the collapsed structure was identified based on the analysis of the information regarding the explored pathways and the unexplored pathways within the collapsed structure received from the other robots; and determine whether the probe reached the environment outside the collapsed structure via the new pathway.

19. The robot of claim 18, wherein the program instructions further cause the robot to:

establish the power supply for the robot, the communication link with the emergency responders, and the fresh air and water supply for the survivor using the indication flag of the probe in response to determining that the probe did reach the environment outside the collapsed structure via the new pathway.

20. The robot of claim 18, wherein the program instructions further cause the robot to:

locate a piece of metal to physically tap a distress signal indicating a location of the survivor trapped in the debris of the collapsed structure in response to determining that the probe did not reach the environment outside the collapsed structure via the new pathway.

\* \* \* \* \*